J. B. UNDERWOOD.
Coffee-Roaster.
No. 204,635. Patented June 4, 1878.
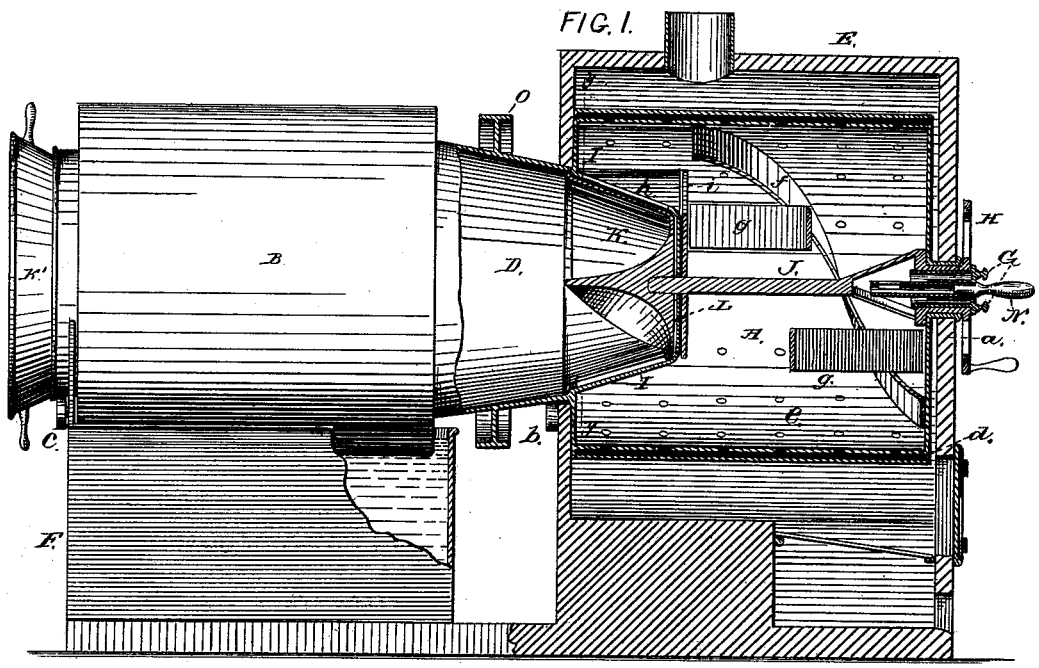
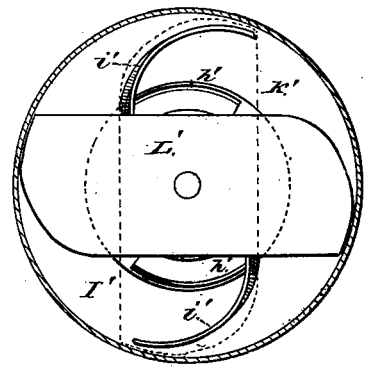
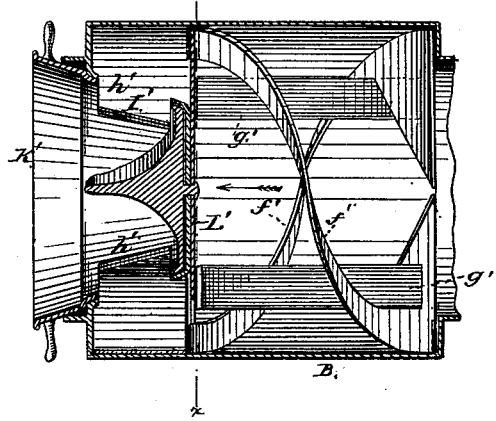
WITNESSES:
INVENTOR:
J. B. Underwood
BY
ATTORNEYS.

2 Sheets—Sheet 2.

J. B. UNDERWOOD.
Coffee-Roaster.

No. 204,635. Patented June 4, 1878.

WITNESSES:

INVENTOR:

ATTORNEYS.

UNITED STATES PATENT OFFICE.

JOSEPH B. UNDERWOOD, OF FAYETTEVILLE, NORTH CAROLINA, ASSIGNOR TO ANNIE V. JESSUP.

IMPROVEMENT IN COFFEE-ROASTERS.

Specification forming part of Letters Patent No. 204,635, dated June 4, 1878; application filed April 23, 1878.

*To all whom it may concern:*

Be it known that I, JOSEPH B. UNDERWOOD, of Fayetteville, in the county of Cumberland and State of North Carolina, have invented a new and Improved Coffee-Roaster; and I do hereby declare that the following is a full, clear, and exact description of the same, reference being had to the accompanying drawing, forming part of this specification, in which—

Figure 4:
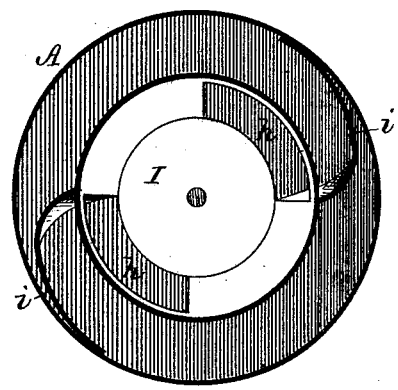
Figure 5:
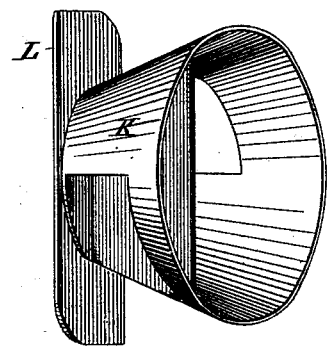

Figure 1 is a side view, with the roasting-cylinder and furnace in vertical central longitudinal section. Fig. 2 is a vertical longitudinal section of the cooling-cylinder and valve, with the spiral conveyers intact. Fig. 3 is a transverse section through line $x\ x$ of Fig. 2, looking in the direction of the arrow. Fig. 4 is a transverse section through the rear end of either of the cylinders, (through the plane $y\ y$, Fig. 1,) the valve being removed to show the frustum-shaped head and its openings and the curved pocket-pieces leading thereto. Fig. 5 is a perspective view of the valve and its attached blade, whose openings register with the openings of Fig. 4, and whose blade co-operates with the curved pocket-pieces.

The object of my invention is to provide a combined coffee roaster and cooler in which the charge of coffee in the roasting-cylinder shall be transferred to the cooling-cylinder without exposure to the air, and in an automatic manner, by the simple rotation of the cylinders, without raising the same into a vertical position.

To this end my invention consists, chiefly, in combining a cooling and roasting cylinder by eans of a conical pipe having its largest end next to the cooling-cylinder, and in arranging in connection therewith peculiarly-shaped valves for controlling communication between the cylinders, together with spiral conveyers for transferring the bulk of coffee from the roasting to the cooling cylinder, as hereinafter more fully described.

In the drawing, A represents the roasting and B the cooling cylinder, which are connected by means of a conical pipe, D. The roasting-cylinder A is arranged within the combustion-chamber of a furnace, E, so that the hot currents shall circulate around the same, while the cooling-cylinder is partly within a water-tank, F, in which water is placed, so as to partly surround the cooling-cylinder and reduce the temperature of the same. Both these cylinders A and B are arranged to revolve together by means of a band-flange, O, between the same, and in their said revolution are sustained by a bearing, $a$, in the front wall of the furnace, friction-wheels $b\ b$ upon the rear wall of the furnace, arranged to bear against the conical pipe between the cylinders, and friction-wheels $c\ c$, arranged upon an extension of the water-tank, and adapted to support the rear flange of the cooling-cylinder.

The roasting-cylinder A is constructed with an outer shell, $d$, and an inner perforated lining, $e$, within which are arranged spiral wings or conveyers $f$ and reversely-arranged stirring and retracting blades $g$. The coffee is introduced into this cylinder through an opening in its end, which is closed by a removable cap or head, G, through which head a removable "trier" or "sampler," N, projects, which is adapted to catch a quantity of the coffee-beans and be pulled out to permit the progress of the roasting to be watched, as heretofore used. H is a wheel having a crank for turning the same. This wheel has a concentric collar embracing the removable head G, which collar enters the opening in the end of the cylinder, and connects axially with the valve controlling the openings between the two cylinders, the said wheel affording means for opening or closing the said valve.

The rear head I of the roasting-cylinder is made in the shape of a frustum of a cone, having upon its tapering or conical sides diametrical openings $h\ h$, Fig. 4. Centrally through this head passes the shaft J, which is connected to the wheel H upon the outside, and which shaft is attached to an axially-moving valve, K, Fig. 5, made also in the shape of the frustum of a cone, and having tapering sides which are adapted to pass over and close the openings $h$. Moving with the valve, and attached to the shaft J just inside the head I, is a blade, L, Figs. 1 and 5, which, when the valve is turned from the opening, h, forms, with stationary curved pieces i, Fig. 4, a hopper to direct the coffee carried up by the conveyer out through the openings and into the conical pipe connecting with the cooling-cylinder.

In the cooling-cylinder are arranged, in the same manner as in the roasting-cylinder, spiral conveyer-blades f, Fig. 2, retracting and stirring blades g', a frustum-shaped head, l', with openings h' h', Fig. 3, corresponding valve K', blade L', moving with the valve, and stationary curved pieces i', co-operating with the blades L' when the valve is open, to form a hopper to direct the coffee out through the open end of the cooling-cylinder.

The combined operation of the roaster and cooler is as follows: The roasting-cylinder being charged with a sufficient quantity of coffee, and the valves K and K' being closed, the conveyer in the roasting-cylinder carries the coffee toward the rear end of the cylinder, and the coffee, not being allowed to pass out, is prevented from banking up in this end of the cylinder by the retracting-blades g, which are arranged reversely to the conveyers, to carry the coffee in the opposite direction, at the same time thus effectually stirring it. After the coffee has become properly roasted, valve K is turned axially by means of the wheel H. This movement uncovers the openings h h, and at the same time brings blades L up adjacent to the curved pieces i, so as to form pockets or hoppers, into which the conveyers lead and deliver the coffee. After the coffee has all passed from the roasting to the cooling cylinder in this manner, the valve K is closed again and a fresh charge placed in the roasting-cylinder through its removable head. This last charge is then roasted while the first is being cooled by the stirring action of the conveyers and retractors f' g', with the surface of the cylinder in contact with the water in the subjacent tank. After the first charge is completely cooled, and has restored to it the condensed volatile products which have not had an opportunity to escape by exposure to air, the valve K' is turned by handles at the rear of the cylinder, and the cooled coffee allowed to pass out from the device in the same manner in which its transfer was effected from the roasting-cylinder to the cooling-cylinder.

With respect to the spiral conveyers, I would state that I do not claim, broadly, the use of the same in a coffee-roaster, but only the combination of the same with a roasting and cooling cylinder having intercommunication controlled by valves, whereby the charge of roasted coffee is transferred to the cooling-cylinder without exposure to air, and without altering the position of the cylinder.

Having thus described my invention, what I claim as new is—

1. A combined coffee roaster and cooler consisting of two revolving cylinders or receptacles having intercommunication controlled by valves, and provided with spiral conveyers for stirring and transferring the coffee, substantially as described.

2. In a coffee-roaster, a cylinder having a head in the shape of a frustum of a cone, with outlet-openings upon the side thereof, combined with a correspondingly-shaped valve arranged to move axially, as described.

3. The combination, in a coffee-roaster, with the cylinder having spiral conveyers and curved pieces i, of the valve K and attached blades L, substantially as and for the purpose described.

4. The combination, with the cylinder A, of the valve K and wheel H, arranged at the front end of the cylinder, and connected axially with said valve, substantially as and for the purpose described.

5. The cylinders A and B, combined with each other and connected by a conical pipe having its largest end next to the cooling-cylinder, as shown and described.

6. The combination, with the cylinders and their connecting conical pipe, of a band-flange, O, located upon said pipe, to afford means for rotation, as shown and described.

JOSEPH B. UNDERWOOD.

Witnesses:
GEO. A. OVERBOUGH,
W. J. McDONALD, Jr.